United States Patent [19]
Faris

[11] Patent Number: 5,457,554
[45] Date of Patent: Oct. 10, 1995

[54] 3-D PRINTING TECHNOLOGY BASED ON SELECTIVE REFLECTING POLARIZING MEDIA

[76] Inventor: Sadeg M. Faris, 24 Pocantico River Rd., Pleasantville, N.Y. 10570

[21] Appl. No.: 51,646

[22] Filed: Apr. 26, 1993

[51] Int. Cl.$^6$ .............. G02F 1/1335; G02F 1/1333; G02B 27/22; G02B 27/26
[52] U.S. Cl. .............. 359/65; 359/83; 359/101; 359/464; 359/465
[58] Field of Search .............. 359/65, 70, 83, 359/101, 462, 464, 465, 466

[56] References Cited

U.S. PATENT DOCUMENTS

| | | | |
|---|---|---|---|
| 2,820,395 | 1/1958 | Rehorn | 359/464 |
| 4,792,850 | 10/1989 | Kalmanash | 359/465 |
| 4,877,307 | 12/1989 | Liptoh et al. | 359/465 |
| 4,957,351 | 9/1990 | Shioji | 359/462 |
| 4,959,641 | 9/1990 | Bass et al. | 359/462 |
| 5,113,285 | 5/1992 | Franklin et al. | 359/465 |
| 5,121,343 | 6/1992 | Faris | 395/111 |
| 5,146,415 | 9/1992 | Faris | 395/101 |
| 5,165,013 | 11/1992 | Faris | 359/104 |
| 5,264,964 | 11/1993 | Faris | 359/465 |

FOREIGN PATENT DOCUMENTS

| | | | |
|---|---|---|---|
| 1-296215 | 11/1989 | Japan | 359/465 |
| 4-107524 | 4/1992 | Japan | 359/65 |

*Primary Examiner*—Anita Pellman Gross
*Attorney, Agent, or Firm*—Thomas J. Kilgannon

[57] ABSTRACT

An apparatus for generating a three-dimensional image including two unmultiplexed images in stereoscopic relationship with each other. One of the images is of a material reflective of a given wavelength of left-handed (or right-handed) circularly polarized light, while the other of the images is of a material reflective of the given wavelength of right-handed (or left-handed) circularly polarized light. The materials include cholesteric liquid crystals.

32 Claims, 2 Drawing Sheets

3-D PRINTING TECHNOLOGY BASED ON SELECTIVE REFLECTING POLARIZING MEDIA

BACKGROUND OF THE INVENTION

1. Field of the Invention

This invention relates generally to the field of 3-D printing and 3-D stereo imaging technologies. More particularly, it relates to the field of computer hard copy output devices that produce 3-D images. Still more particularly, it relates to the production of 3-D movies, slide projection images, 3-D portraits, paintings and the like and the resulting products.

2. Description of Related Art

Because of their large birefringence and electro-optical properties, liquid crystals are materials which are becoming pervasive in our daily lives. They are found in wristwatches, calculators, and computer displays. Liquid crystals are found in three general broad classes: Smectic, Nematic; and Cholesteric (see Jacobs et al, U.S. Pat. No. 5,054,888); Jacobs et. al., *Journal of the Optical Society of America*, B, Vol. 5 (9), pp 1962–1978 (September 1988); Martin Schadt and Jurg Funfschilling, Society of Information Displays, *SID 90 DIGEST*, p 324 (1990); and Robert Maurer, et. al., Society of Information Displays, *SID 90 DIGEST*, p 110 (1990). Cholesteric Liquid Crystals (CLC) form left handed or right handed helical structures with a helix pitch, P. The structure of an aligned cholesteric liquid crystal consists of multi-layers (parallel planes). Each layer has rod-like molecules which are ordered in a specific orientation in the direction of a director. The orientations of the directors of successive layers (planes) describe a helical path which is either left-handed (LH), or right-handed (RH). These materials are optically active and have an optical axis parallel to the helix axis and perpendicular to the molecular planes. An (RH) film prepared with its optical axis perpendicular to the film exhibits the property of selective reflection when a monochromatic beam of wavelength, $\lambda$, propagating along the helix axis satisfies the relationship $$\lambda = \lambda o = n_a P \qquad (1)$$

where $n_a$ is the average refractive index of the CLC material and P as its pitch. Unpolarized light with wavelength $\lambda = \lambda o$ incident on the film interacts with the helix structure and reflects 50% of its intensity as right circularity polarized light (RCP), and the other 50% is transmitted as left circularly polarized light (LCP) through the film. If one incident light has one or more wavelengths that are not equal to $\lambda o$, all the light is transmitted. Note that equation (1) is strictly valid in the case where the angle of incidence $\theta$ (measured from the helix axis) is zero For a non-zero value of $\theta$, the effective value of $\lambda o$ shifts to a shorter wavelength, $\lambda \theta$, given by $$\lambda \theta = \lambda o [\cos\{\sin^{-1}(\sin\theta/n_a)\}] \qquad (2)$$

In all subsequent discussions in this application, whenever $\theta \neq 0$, it is implied that $\lambda o$ means $\lambda \theta$ as given by Eq. 2. If the film has an LH helix, and the incident unpolarized light satisfies $\lambda = \lambda o$, 50% of the selectively reflected polarized light will have the LCP state, and the other 50% transmitted through the film will have the RCP state. The selective reflection wavelengths according to Eq. 1 are obtained by the pitch length which is a material property that may be varied by varying the chiral concentration or the concentration of the mesogenic side-groups (see U.S. Pat. No. 4,410,570). Thus, the CLC materials may be prepared to produce the three additive primary colors; red, green, and blue or any other color. It is important to note that this selective reflection polarizing property does not involve or depend on an absorptive mechanism as in the case of conventional color pigments, dyes and sheet polarizers.

A fundamental property of light is that it can have only two independent, mutually orthogonal polarization states, either circular LCP and RCP states or linear states. Embodiments shown in the present application utilize the well-known phenomenon that LCP light incident on a metallic reflector is converted into RCP light because the metal causes a phase shift of 180° between the independent electric field vector components. Similarly, a quarter-water retarder causes a 90° phase shift and converts a circularly polarized light into linear polarized light or a linear polarized light into circularly polarize light. Also, a half-wave retarder converts RCP light into LCP light and vice versa by causing a phase shift between the independent electric field vector components.

The present invention relies On CLC materials in the solid state at the operation temperature. Such CLC polymers have been synthesized in the LH and RH formulations (See Tsai et al, Appl. Phys. Lett., 54, 2395 (1989)).

SUMMARY OF THE INVENTION

This invention teaches a new method for printing, painting, and plotting 3-D images without the loss of intensity as a result of spatial multiplexing, and without the absorptive loss of intensity due to the presence of μPol arrays. This new technology utilizes the selective reflecting polarizing properties of cholesteric liquid crystals (CLC) which polarize light based on reflection instead of absorption. The CLC materials are used as the image producing elements and simultaneously as the polarizing elements. This combines the function of spatial multiplexing and polarization coding that, in the prior art, U.S. Pat. Nos. 5,121,343 and 5,146,415, requires two different elements, namely a μPol array and a spatial multiplexor. In other words, the elements required for spatial multiplexing and polarization coding are substituted for by the image transfer medium (ink, crayon, etc.) itself. The new CLC based 3-D imaging and printing technology, therefore, not only improves the quality of the image and its brightness, but it also simplifies the imaging and printing process with consequent cost reductions.

The principal object of the present invention, is, therefore, to provide a novel 3-D stereo imaging (printing, painting and plotting) technology.

Another object of this invention is to provide 3-D printing, painting and plotting technologies with fewer elements, and lower processing costs.

Another object of this invention is to provide a novel 3-D stereo printing, painting and plotting technology that produces brighter and higher quality images.

Another object of this invention is to provide 3-D stereo printing, painting, and plotting devices which can be driven by means of computers.

Another object of this invention is to provide 3-D hard copy output devices that produce images either automatically, or manually.

Another object of this invention is to provide 3-D images that are produced by conventional printing and plotting means in conjunction with left hand and right hand polarized CLC inks or other transfer media.

A feature of the present invention is the utilization of two CLC inks, left handed and right handed inks. The left handed ink reflects the left circularly polarized portion of the illuminating light and is used to print, paint, or plot the left image. This left image is viewed with a left circular polarizer placed on the left eye. The right handed ink reflects the right circularly polarized portion of the illuminating light and is used to print, paint, or plot the right image. This right image is viewed as right circularly polarized light with a right hand circular polarizer over the right eye. The left and right images as formed by the image transfer medium (ink, paint or crayon) are spaced apart laterally (as a function of their desired depth) to provide the required stereo displacement for obtaining three dimensional images by a viewer. Also, since the operative images are reflective, they should be generated on a light absorptive or nonreflecting background.

Another feature is the utilization of left handed and right handed CLC films to carry the left and right images, respectively, producing a 3-D stereo image.

The foregoing and other objects and features of the present invention will become clear when taken in conjunction with the following drawings.

DETAILED DESCRIPTION OF PREFERRED EMBODIMENTS

Polarization of Light

Electromagnetic waves propagating in free space have electric and magnetic fields which are transverse to the propagation direction. There are two possible orientations for each of the electric and magnetic fields which are called polarization states. The E1 and H1 transverse fields represent a wave having a polarization state P1 while the E2 and H2 transverse fields represent another independent wave having a polarization state of P2 which is obviously orthogonal to P1. Light from the sun, fluorescent lamps and incandescent bulbs is unpolarized, and is represented by electromagnetic plane waves which are incoherent mixtures of wavelengths, polarizations, amplitudes, and phases. It is possible to resolve all the electric field vectors of unpolarized light along two axes in a transverse plane, for instance, the x and y axes. Half of the light energy (luminance or brightness) so resolved is in the polarization state, P1, along the x-axis, while the other half is in the other polarization state, P2, along the y-axis. When the x and y components of an electric field oscillate in phase, the field is linearly polarized. If they oscillate out of phase, the field is elliptically polarized and is described by the following equation:

$$E=E_x \cos(\omega t)+E_y \sin(\omega t+\phi) \qquad (3)$$

The equation describes a rotating vector in the transverse plane, and the rotation path is an ellipse with major and minor axes $E_x$ and $E_y$, respectively. There are two independent elliptically polarized states: one that rotates clockwise (right-handed) given by $\phi=0$; and the other that rotates counter-clockwise (left-handed) given by $\phi=\pi$. These two states become circularly polarized when $E_x=E_y$. As previously indicated, it is possible to convert circular into linear polarization by inserting a quarter-wave retarder in the light path which introduces a phase shift of $\phi=\pi/2$ in Eq. 3. Also, to convert one polarization state P1 (linear or circular) into an orthogonal state P2, a half-wave retarder is used which introduce a phase shift of $\phi=\pi$ in Eq. 3.

Figure 1:
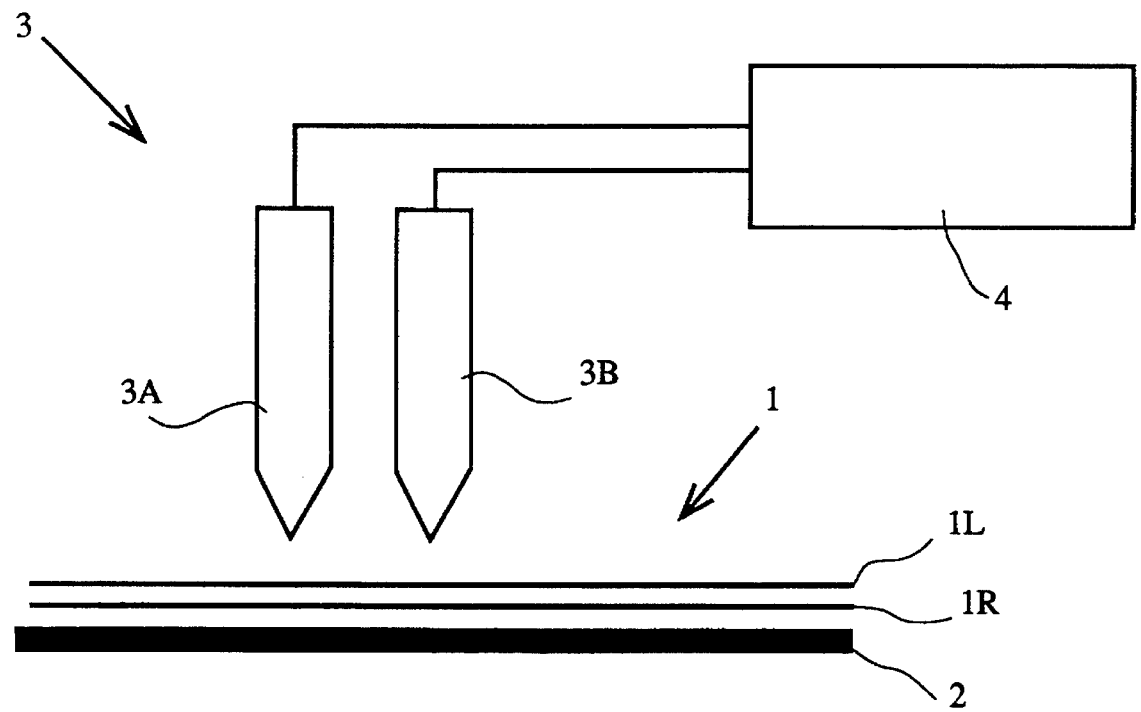
FIG. 1 is a partially schematic, partially cross-sectional view of the preferred embodiment of the present invention for producing hard copy, 3-D images.

Referring to FIG. 1, there is shown a partially schematic, partially cross-sectional view of a preferred embodiment of the present invention for producing hard copy 3-D images. It comprises an image generating means which drives ink releasing means which applies, either sequentially or in parallel, left-handed and right-handed cholesteric liquid crystal (CLC) inks of a desired color onto a radiation absorbing substrate. In FIG. 1, image 1, consists of a left-handed image 1L, and a right-handed image 1R which overlay each other without interference on a radiation absorbing substrate 2. The left and right-handed images are distinct because they are produced by means of left and right-handed CLC inks, respectively, which, owing to the selective reflection properties reflect left circularly polarized light and right circularly polarized light, respectively, producing separate light images when appropriately detected. In FIG. 1, ink releasing means 3 shown in the form of pens 3A, 3B releases ink onto the surface of substrate 2. One of the pens deposits or writes with left-handed (LH) CLC ink while the other of the pens writes with right-hand (RH) CLC ink. Ink releasing means 3 can produce left and right images of primary colors sequentially or in parallel. In the parallel mode, ink releasing pens 3A and 3B are driven to release their respective CLC inks in parallel or simultaneously. In the sequential mode, a single ink releasing pen is driven at any one time. In FIG. 1, image generation means shown therein as block 4, may be an operator, in the case of manual painting or drawing, or it may be a computer driven printing means or offset printing, gravure or flexographic printing means. When an image in the form of a drawing or painting is done manually, ink releasing means 3 may be a pen, pencil, brush, or crayon which applies the LH CLC or the RH CLC inks on substrate 2. In the instance of computer generated prints, ink releasing means 3 are pens similar to those utilized in pen plotters or a thermal printing head which locally melts LH or RH CLC coated ribbons to release the CLC inks onto substrate 2. Alternatively, ink releasing means 3 may be in the form of nozzles such as utilized in ink jet printers. For commercial printing, ink releasing means 3 includes cylinders covered with patterned plates which carry the desired images. Each patterned plate is coated by means of rollers with either the LH or RH CLC ink and the inks are then applied to a substrate 2 with which they come in contact. Nearly all commercial printing technologies such as offset printing, gravure, flexographic, and screen printing may be utilized with their conventional inks being replaced with LH and RH CLC inks. The printing means 3, 4 may be replaced with a printing apparatus that coats and patterns LH and RH films representing the left and right images, respectively. Unlike all previous printing technologies which utilize reflective white substrates, this novel printing technology, when viewed in the reflective mode, requires the use of radiation absorptive or black substrates. Thus, in FIG. 1, substrate 2 may be black paper, plastic, metallic surfaces or other surfaces that are coated with light absorptive black or non-reflecting material. In order to produce color images, the LH and RH CLC inks are designed to have three additive primary colors, red (R), green (G), and blue (B). These colors may be mixed in the traditional way to obtain any desired color. When viewed in the transmissive mode, substrate 2 should be a clear light transmission material. In the transmissive mode, using the same CLC RGB inks as in the reflective mode, the resulting image will automatically appear as a mixture of subtractive colors, namely, cyan, magenta, yellow. Therefore, if one wants to have a stereo image in the transmissive mode, one should take into account the subtractive color mixing rules well known in the art. The resulting images are, of course, viewed from the substrate side in the transmissive mode.

In a typical printing process, three RGB images are needed for the left perspective using LH CLC inks, and three RGB images for the right perspective using RH CLC inks. It is important to note that all of these inks may be applied on top of each other because the selective reflection property at different wavelengths of CLC inks does not permit interference between the left and right perspectives, and because of the ability to mix the colors in an additive fashion. This feature, therefore, increases the brightness of the reflected images and the resolution by a factor of two when compared with prior art approaches (U.S. Pat. No. 5,121,343). The images thus produced, when viewed as shown in FIG. 2 by means of special glasses, present a three-dimensional (3-D) image to a viewer.

Figure 2:
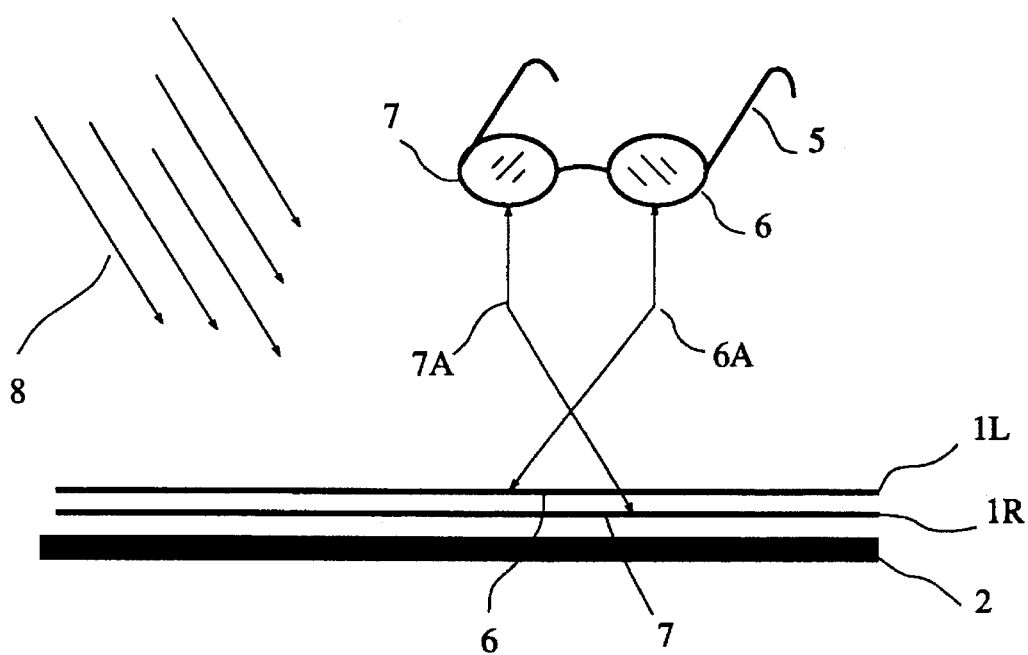
FIG. 2 shows a partially schematic, partially cross-sectional view of the substrate and images of FIG. 1. It further shows special glasses utilized to obtain a 3-D image of the stereo displaced, two dimensional images disposed on a radiation absorptive substrate.

FIG. 2 shows a partially schematic, partially cross-sectional view of the substrate and images of FIG. 1 and further shows special glasses utilized to obtain 3-D images of the two dimensional images disposed on an absorptive or non-reflecting substrate. In FIG. 2, special glasses 5 include a left circular polarizer 6 for covering the left eye of a viewer, and a right circular polarizer 7 for covering the right eye of a viewer. The deposited images are viewed in the reflective mode and illuminated by unpolarized light 8. The left image formed by LH CLC ink 1L in FIG. 2, reflects left circularly polarized light; it can only be viewed by a left eye through its left circular polarizer 6. Similarly, the right image formed by RH CLC ink, 1R in FIG. 2, which reflects right circularly polarized light, can only be seen by a right eye which is covered by right circular polarizer 7. This enables the brain to interpret the images as 3-D stereo with depth provided that images 1L, 1R are stereoscopically related. See "The World of 3-D", J. G. Ferwerda, 3-D Book Productions, 1990, Borger, The Netherlands, which is hereby incorporated by reference. This well known relationship is normally provided by the fact that the human eyes, when viewing any three dimensional object, each sees a slightly different image because of the lateral displacement of one eye from the other. The separately received images are fused normally by the brain to present a three-dimensional view of the object being scanned. To the extent that images 1L, 1R in FIG. 2 are two-dimensional as applied to substrate 2, the normal lateral displacements are provided by stereoscopically displacing them and presenting one image, 1L, to the left eye by transmitting only LH reflected light through polarizer 6 and the other image, 1R, to the right eye by transmitting only RH reflected light through polarizer 7. The brain of the observer then fuses the images in the normal way because it senses two laterally displaced images.

From the foregoing, it should be clear that CLC inks may be used to provide selectively reflecting images which, with the proper stereoscopic displacement and polarizing lenses, present images to the brain which are fused to give a 3-D impression of two dimensional images. Thus, any transfer medium which can carry CLC flakes, platelets or laminae may be used to provide spatial multiplexing and polarization decoding as described herein. CLC flakes may be provided even in crayon form with the flakes being carried in the solid carrier medium of well-known crayons. The wavelengths to be reflected would match the color of the crayon and, of course, would be either LH or RH reflecting. Again, in use, the appropriate lateral displacements would be required to provide a three dimensional image.

Up to this point, the images formed have been shown to be supported on a radiation absorbing or non-reflecting substrate. However, it should be appreciated that images, however formed, need not strictly be disposed on a physical substrate. As long as the images used are reflective of LH and RH circularly polarized radiation, they may be suspended by wires against a night sky, for example, and if provided with the appropriate stereoscopic relationship, a three dimensional image will be presented to a viewer.

Figure 3:
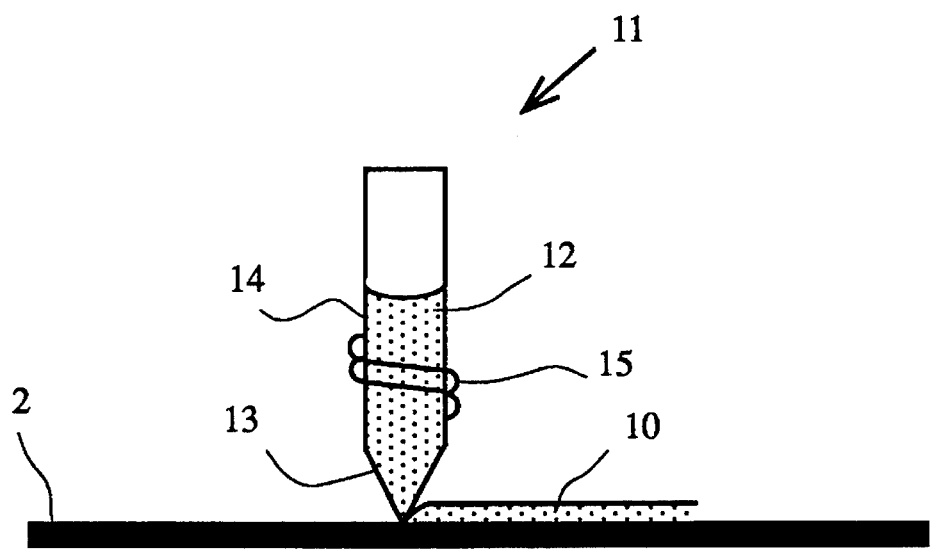
FIG. 3 shows a schematic drawing of a special pen which houses the CLC ink which is heated by means of a surrounding heating element to melt it and then apply it on a substrate.

Referring now to FIG. 3, there is shown therein a schematic drawing of a special pen which houses a CLC ink in solid form. The solid ink is heated by means of a surrounding heating element to melt the ink and apply it to a substrate.

In FIG. 3, a substrate 2 is shown having an image layer 10 which consists of a carrier material having a plurality of CLC flakes, laminae or platelets disposed therein. Layer 10 is speckled to indicate the presence of CLC flakes or platelets in FIG. 3. Layer 10 is formed or written by a pen 11 which includes a hollow portion 12 and a point 13 which is adapted to permit the flow of ink when flake or platelet containing ink 14 in solid form is melted by an operating electrical healing coil 15. The relative motion between pen point 13 and substrate 2 is sufficient to cause the CLC flakes or platelets to align themselves essentially parallel to the surface of substrate 2. Of course, another pen similar to pen 11 containing CLC flakes to reflect the opposite polarization from an appropriately displaced image would be required to provide a 3-D image.

Figure 4:
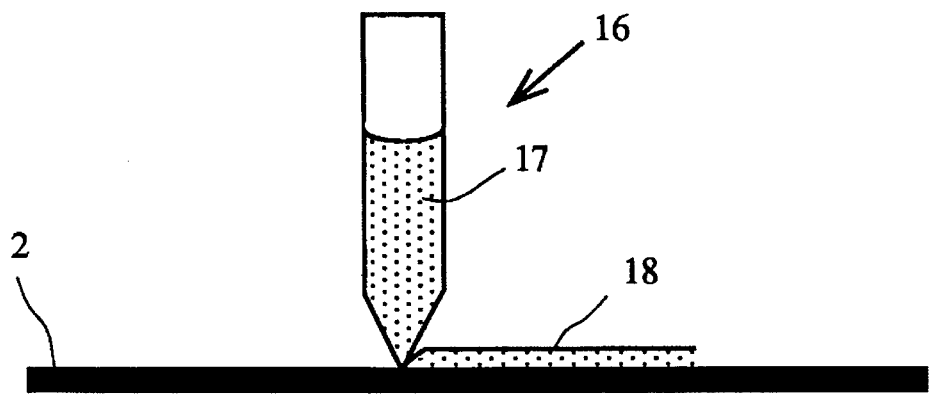
FIG. 4 illustrates another embodiment which uses a pen and ink which contain flakes of material suspended in an appropriate carrier liquid.
Figure 5:
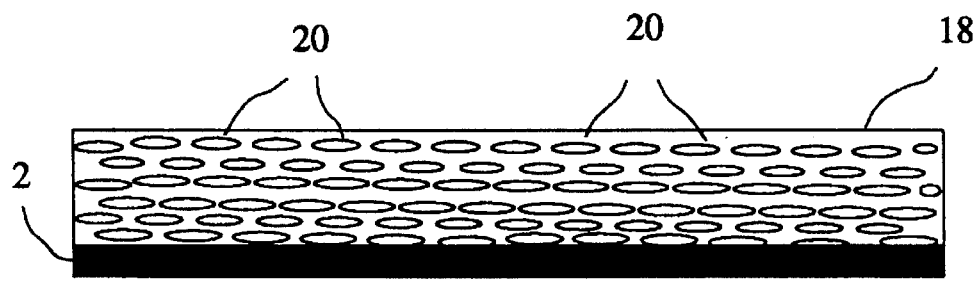
FIG. 5 is an enlarged cross-sectional view of the ink and substrate of FIG. 4 showing flat flakes of CLC material disposed substantially parallel to the surface of an absorptive substrate.

FIG. 4 illustrates another embodiment which utilizes liquid ink containing CLC flakes, laminae or platelets. An enlarged cross-sectional view of the ink and substrate of FIG. 4 in FIG. 5 shows flat flakes or platelets of CLC material disposed substantially parallel to the surface of a radiation absorptive substrate 2. In FIG. 4, pen 16 contains a carrier liquid 17 which itself contains CLC flakes or platelets represented by the speckling in liquid 17. When dispensed, liquid 17 flows onto the surface of radiation absorbing substrate 2 and dries to form a reflecting image layer 18 when illuminated by ambient light. The enlarged view in FIG. 5 shows layer 18 greatly magnified containing a plurality of CLC flakes 20 disposed therein. As shown in FIG. 5, CLC flakes 20 are all roughly parallel to the surface of substrate 2 and are further disposed in overlapping relationships such that illuminating radiation or light is all reflected and does not penetrate to substrate 2. In the arrangement of FIG. 4, the relative motion between pen 16 and substrate 2 causes the CLC platelets 20 to assume positions substantially parallel to the surface of substrate 2. Nonparallel platelets, in any event, simply do not reflect and reflectivity is degraded very little, if at all.

Up to now, little has been said relative to the inks, paints, crayon film coatings and the like which may be used in the practice of the present application. LH and RH inks which may be used are described in a copending patent application entitled "Aligned Cholesteric Liquid Crystal Inks" by S. M. Faris, Ser. No. 07/798,881, filed Oct. 27, 1991 and is hereby incorporated by reference.

With respect to solid inks containing CLC platelets, inks described in the above mentioned copending application may be used with the proviso that the carrier incorporated be solid at room temperature. One such carrier material is wax.

Similarly, CLC flakes may be incorporated into commercially available crayon materials without departing from the spirit of the present application. Crayons have particular applications where, for example, pairs of two dimensional drawings can be colored with RH and LH materials which, when viewed with glasses, provide 3-D images. Also, wearing the polarizing glasses, an artist may create 3-D images using LH and RH paints as he paints. The resulting paintings will have an entirely different look when viewed in 2-D (without glasses). Computer generated images will provide a similar effect.

To generate the stereoscopic image one may also use thin CLC films appropriately aligned to exhibit the selective reflection properties (left-handed and right-handed).

The image is recorded in said thin CLC films by means of lithographic technique (photolithography) and etching or UV curing means.

I claim:

1. Apparatus for generating a three-dimensional image comprising:
    at least a first unmultiplexed image made of a material reflective of at least a given wavelength of one of left-handed and right-handed circulary polarized electromagnetic radiation, and,
    at least a second unmultiplexed image disposed in stereoscopic relationship with said at least a first image reflective of said at least a given wavelength of the other of left-handed and right-handed circularly polarized electromagnetic radiation.

2. Apparatus according to claim 1 further including a substrate upon which said at least first and second images are disposed.

3. Apparatus according to claim 1 further including a substrate upon which said at least first and second images are disposed which is absorptive of said electromagnetic radiation.

4. Apparatus according to claim 1 further including a substrate which is transparent to said electromagnetic radiation and upon which said at least said first and second images are disposed.

5. Apparatus according to claim 1 further including means for illuminating said at least first and second images with unpolarized electromagnetic radiation.

6. Apparatus according to claim 1 further including means disposed at a distance from said at least first and second images for detecting said left-handed and right-handed circularly polarized electromagnetic radiation at said at least a given wavelength.

7. Apparatus according to claim 1 wherein said material includes a cholesteric liquid crystal material.

8. Apparatus according to claim 1 wherein said material includes a cholesteric liquid crystal material in a transfer or carrier medium.

9. Apparatus according to claim 1 wherein said material includes flakes of a cholesteric liquid crystal material.

10. Apparatus according to claim 1 wherein said material includes flakes of a cholesteric liquid crystal material disposed in a transfer or carrier medium.

11. Apparatus according to claim 1 wherein said at least a given wavelength is in the visible spectrum.

12. Apparatus according to claim 1 further including means connected to said at least first and second images for adjusting said stereoscopic relationship.

13. Apparatus according to claim 2 further including means for generating said at least first and second images on said substrate.

14. Apparatus according to claim 3 further including means for generating said at least first and second images on said absorptive substrate.

15. Apparatus according to claim 4 further including means for generating said at least first and second images on said transparent substrate.

16. Apparatus according to claim 6 wherein said means for detecting includes glasses having a pair of lenses, one of which passes left-handed circularly polarized electromagnetic radiation and the other of which passes right-handed circularly polarized electromagnetic radiation.

17. Apparatus according to claim 14 wherein said means for generating includes means for simultaneously depositing said materials to generate said at least first and second images.

18. Apparatus according to claim 14 wherein said means for generating includes means for sequentially depositing said materials to generate said at least first and second images.

19. Apparatus according to claim 14 wherein said means for generating includes at least a single pen having a heated reservoir from which said materials are dispensed.

20. Apparatus according to claim 14 wherein said means for generating includes a print head and at least a single transfer element from which said materials are deposited on said substrate.

21. Apparatus according to claim 14 wherein said means for generating includes at least a crayon from which said materials are deposited on said substrate.

22. Apparatus according to claim 14 wherein said means for generating includes means for depositing said at least first and second images which is under computer control.

23. Apparatus according to claim 14 wherein said means for generating includes means for depositing a plurality of said at least first images in a superimposed relationship and a plurality of said at least a second image in a superimposed relationship, pairs of said first and second images having the same color, and each pair having a different color from every other of said pairs.

24. Apparatus according to claim 14 further including means for applying relative motion between said means for generating and said substrate.

25. Apparatus for generating a three-dimensional image comprising:
    at least a first unmultiplexed image made of material reflective of one of left-handed and right-handed circularly polarized electromagnetic radiation of at least a given wavelength and transmissive of the other of left-handed and right-handed circularly polarized electromagnetic radiation at said at least a given wavelength, and,
    at least a second unmultiplexed image disposed in stereoscopic relationship with said at least a first image reflective of the other of left-handed and right-handed circularly polarized electromagnetic at said at least a given wavelength and transmissive of said one of left-handed and right-handed circularly polarized electromagnetic radiation at said at least a given wavelength.

26. Apparatus according to claim 25 further including a substrate upon which said at least first and second images are disposed.

27. Apparatus according to claim 25 further including means for illuminating said at least first and second images with unpolarized electromagnetic radiation.

28. Apparatus according to claim 25 further including means disposed at a distance from said left-handed and right-handed circularly polarized electromagnetic radiation.

29. Apparatus according to claim 25 wherein said material includes flakes of cholesteric liquid material disposed in a transfer medium.

30. Apparatus according to claim 26 further including means for generating said at least first and second images on said substrate.

31. Apparatus for generating a three-dimensional image comprising:

at least a first unmultiplexed image made of a material reflective of at least a given wavelength of one of a first and second polarization state of electromagnetic radiation, and, at least a second unmultiplexed image disposed in stereoscopic relationship with said at least a first image reflective of said at least a given wavelength of the other of a first and second polarization state of electromagnetic radiation.

32. Apparatus for generating a three-dimensional image comprising:

at least a first unmultiplexed image made of material reflective of one of a first and second polarization state of electromagnetic radiation of at least a given wavelength and transmissive of the other of a first and second polarization state of electromagnetic radiation at said at least a given wavelength, and, at least a second unmultiplexed image disposed in stereoscopic relationship with said at least a first image reflective of the other of a first and second polarization state of electromagnetic radiation at said at least a given wavelength and transmissive of said one of a first and second polarization state of electromagnetic radiation at said at least a given wavelength.

* * * * *